United States Patent [19]

Maehara

[11] Patent Number: 5,251,119
[45] Date of Patent: Oct. 5, 1993

[54] INVERTER WITH SHARED CHOPPER FUNCTION FOR HIGH INPUT POWER FACTOR WITH RESTRAINED HIGHER HARMONICS

[75] Inventor: Minoru Maehara, Osaka, Japan

[73] Assignee: Matsushita Electric Works, Ltd., Osaka, Japan

[21] Appl. No.: 811,967

[22] Filed: Dec. 23, 1991

[30] Foreign Application Priority Data

Dec. 25, 1990 [JP] Japan .................. 2-405558
Aug. 22, 1991 [JP] Japan .................. 3-211187
Aug. 22, 1991 [JP] Japan .................. 3-211188

[51] Int. Cl.⁵ .................................. H02M 5/458
[52] U.S. Cl. ........................... 363/37; 315/247; 315/226; 363/132
[58] Field of Search ............... 363/37, 132; 315/208, 315/224, 226, DIG. 7

[56] References Cited

U.S. PATENT DOCUMENTS 4,511,823  4/1985  Eaton et al. ................. 315/226
5,063,490 11/1991  Maehara et al. ............. 363/37
5,134,344  7/1992  Vos et al. .................... 315/239
5,182,702  1/1993  Hiramatsu et al. .......... 363/132

FOREIGN PATENT DOCUMENTS

220081   12/1984  Japan ..................... 363/37
60-134776 7/1985  Japan .
2211065  8/1990  Japan .

*Primary Examiner*—William H. Beha, Jr.
*Attorney, Agent, or Firm*—Leydig, Voit & Mayer

[57] ABSTRACT

An inverter device achieving a high input power-factor while restraining higher harmonics to be low is provided by a simple circuit structure, in which a pulsating DC voltage supplied through a rectifier is provided through an inductor to a smoothing condenser and to an inverter circuit section connected to output ends of the rectifier to be in parallel therewith, a smoothed DC voltage from the smoothing condenser is supplied through the inductor to the inverter circuit section, and a high frequency voltage is provided out of the device in response to ON and OFF operation of a switching means in the inverter circuit section.

7 Claims, 8 Drawing Sheets

INVERTER WITH SHARED CHOPPER FUNCTION FOR HIGH INPUT POWER FACTOR WITH RESTRAINED HIGHER HARMONICS

BACKGROUND OF THE INVENTION

This invention relates generally to inverter devices and, more particularly, to the inverter device which supplies to a load a high frequency converted from a DC voltage obtained by rectifying and smoothing an AC source power.

The inverter device of the kind referred to finds its utility when utilized in, for example, lighting fixtures and the like which demanding a supply of stable high frequency voltage.

DESCRIPTION OF RELATED ART

General inverter devices have been constituted preferably by connecting an inverter circuit section, with a chopper circuit interposed, to a full-wave rectifier which is connected through a filter circuit to an AC power source, so as to render input power-factor with respect to the inverter circuit section to be at a high level while reducing higher harmonic component in input current. Thus constituted devices have shown on one hand improvements in the input power-factor and so on but have involved on the other hand a problem that the chopper circuit which is separate from the inverter circuit section has to be provided so that the entire device circuit is required to be complicated and thereby enlarged in size and raised in costs.

In Japanese Patent Laid-Open Publication No. 60-134776, there has been disclosed an inverter device in which an inverter circuit section of a so-called half-bridge arrangement of first and second transistors, first and second diodes, first and second condensers and a transformer connected to a load is provided, and an inductance is connected at an end to an output end of a full-wave rectifier and at the other end to a collector of the second transistor in the inverter circuit section. In this inverter device, the inductance, second transistor and first diode are to function as the chopper circuit. Now, with the second transistor turned ON, a current is caused to flow through a path through the full-wave rectifier, inductance and second transistor, and the inductance is caused to store an energy. When on the other hand the second transistor is turned OFF, an induced electromotive force is generated in the inductance, and this electromotive force charges through the first diode a condenser connected in parallel to a series circuit of the first and second diodes. The first and second transistors are alternately turned ON and OFF so as to act as a switching element of the inverter circuit section providing to the load a high frequency while the second transistor also performs a chopper operation so as to be employable in common to both ways, and the inverter device can be decreased in required number of circuit elements so as to be simplified.

However, the current made to flow to this second transistor employed in common to the both ways is made to be about two times as large as that when employed in single way, due to simultaneous flow of a current to an inverter operating section and a further current to the chopper operating section. Consequently, any loss or stress at the second transistor becomes considerably larger than that at the first transistor, and it is required to use a larger element as the second transistor or to take a measure for remarkably improving heat radiation efficiency for the second transistor. In all events, there arises a difference in the magnitude of the currents respectively flowing to the first and second transistors, so as to cause a problem to occur in that circuit design becomes uneasy.

In Japanese Patent Laid-Open Publication No. 2-211065, there has been disclosed an inverter device in which first and second transistors are connected to first and second diodes on one side of two series circuits of first to fourth diodes, first and second smoothing condensers are connected to an output end of a full-wave rectifier and a load is connected between a junction point of the first and second transistors and a junction point of the first and second smoothing condensers, so that a half-bridge type inverter circuit section can be connected to the full-wave rectifier. In this case, an AC power source is connected, through an inductance, between a junction point of the first and second diodes which forms an AC input end of the full-wave rectifier and a junction point of the third and fourth diodes, and a chopper circuit is formed by an inductance, the first and second transistors and the first to fourth diodes forming the full-wave rectifier.

When in this arrangement a source power voltage is on positive side, the first transistor turned ON renders a current to flow from the source through a path of the inductance, third diode and first transistor, and the inductance stores therein an energy. As the first transistor turns OFF on the other hand, an induced electromotive force is generated in the inductance, and thereby the first and second smoothing condensors are charged through the third and second diodes. Further, when the source power voltage is on negative side, the second transistor is made to act as a switching element in the chopper circuit, the current from the source is made to flow to the inductance through a path of the second transistor, fourth diode and inductance, and thereby the first and second smoothing condensors are charged through the first and fourth diodes. It will be appreciated that, when this operation is sequentially carried out, the first and second transistors operate alternately as the switching element of the chopper circuit every time when the source voltage is on the positive and negative sides of the source voltage, and these first and second transistors are also forming the switching element of the inverter circuit section.

Accordingly, in this known inverter device, both of the first and second transistors are used as the switching element common to the inverter circuit and chopper circuit, so that any losses or stresses at the transistors in the both circuits can be equalized to render the circuit designing relatively easier in respect of the heat radiation of the transistors and so on. In this inverter device, however, there is involved such a drawback that, since the chopper operation is carried out by different one of the first and second transistors on every side of the positive and negative sides of the source power voltage when these transistors operate as part of the chopper circuit, and it becomes difficult to control outputs of the chopper circuit.

Further, in any of the foregoing known devices, there has been involved a problem that, since they include such multi-stage conversions as the rectification from AC to pulsating DC, smoothed DC from the pulsating DC and high frequency from the smoothed DC, the overall efficiency which is calculated out by dividing the output power with the input power is deteriorated.

SUMMARY OF THE INVENTION

A primary object of the present invention is, therefore, to provide an inverter device which is capable of eliminating the foregoing problems involved in the prior art and supplying stably and highly efficiently an input current to a load while restraining any higher harmonics to be low with a simplified circuit arrangement realized.

According to the present invention, this object can be attained by means of an inverter device in which a pulsating DC voltage is supplied from a rectifier receiving a source power voltage from an AC power source to a smoothing condenser, a smoothed DC voltage is applied from the smoothing condenser to an inverter circuit section having an oscillation circuit including a load element, and, when the smoothed DC voltage from the smoothing condenser is applied to a switching means included in the inverter circuit section and also forming part of a chopper circuit, a high frequency voltage is applied to the load element in the oscillation circuit in response to ON/OFF operation of the switching means, characterized in that the pulsating DC voltage supply to the smoothing condenser is carried out through an inductor, and the smoothed DC voltage supply from the smoothing condenser to the inverter circuit section is carried out also through the inductor.

Other objects and advantages of the present invention shall be made clear in following description of the invention detailed with reference to various embodiments of the invention as shown in accompanying drawings.

Now, the term "inverter device" used in the following description is to refer to a device comprising a rectifier, a chopper circuit, an inverter circuit section, a smoothing condenser, an oscillation circuit and, if required, an inrush current preventing means and so on.

The term "inverter circuit section" in the above is to refer to a circuit part which converts a DC input current into a high frequency current.

Further, the term "oscillation circuit" in the above is to refer to a circuit which comprises an inductor, an oscillation condenser, a resistance component and such a load as a discharge lamp.

BRIEF EXPLANATION OF THE INVENTION

While the present invention shall now be described with reference to the embodiments shown in the drawings, it should be appreciated that the intention is not to limit the invention only to these embodiments shown but to rather include all alterations, modifications and equivalent arrangements possible within the scope of appended claims.

DETAILED DESCRIPTION OF THE PREFERRED EMBODIMENTS

Figure 1:
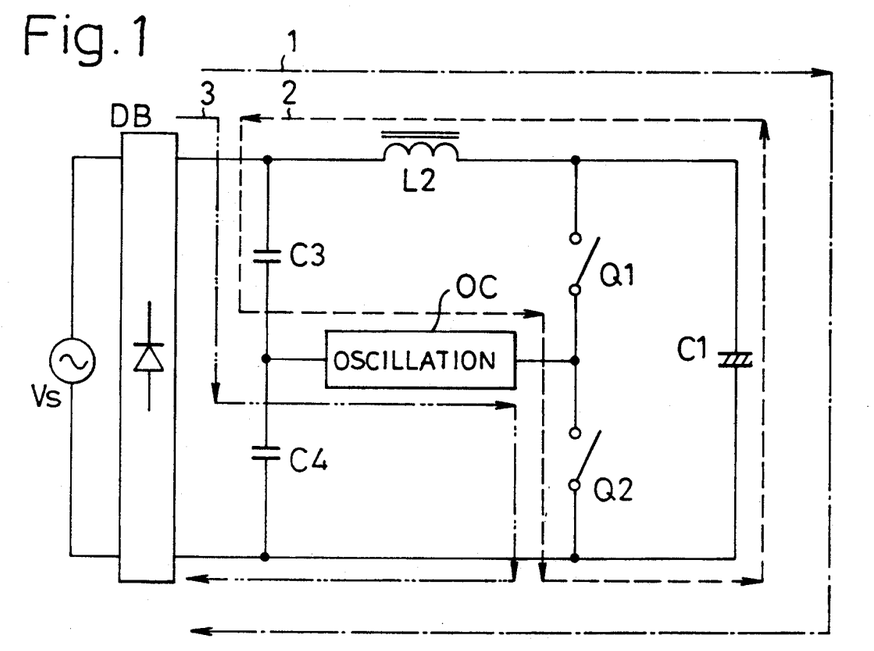
FIG. 1 is a schematic circuit diagram showing a basic arrangement of the inverter device according to the present invention.

With reference to FIG. 1, there is shown a basic circuit arrangement for the inverter device of the present invention, in which an inductor L2 is connected between an output end of a full-wave rectifier DB connected to an AC power source Vs and a smoothing condenser C1, so that there will be formed such a charge loop 1 as denoted by a single-dot chain line and passing through the full-wave rectifier DB, inductor L2 and smoothing condenser C1 as well as such a discharge loop 2 as denoted by a broken line which passing through the smoothing condenser C1 and inductor L2. With this arrangement, there is generated a voltage at the inductor L2 in rightward direction upon discharge of accumulated energy in the smoothing condenser C1. At this time, the voltage at the inductor L2 acts to compensate for any difference between an output voltage of the full-wave rectifier DB and a voltage of the smoothing condenser C1. Therefore, even when the voltage of the rectifier DB is lower than the voltage smoothed by the smoothing condenser C1, the full-wave rectifier DB is made conductive, and an input current can be caused to flow through such a loop 3 as denoted by a double-dot chain line from the full-wave rectifier DB through a condenser C3 of a series circuit of condensers C3 and C4 across output ends of the rectifier DB, an oscillation element in an oscillation circuit OC and a switching element Q2 of a series circuit of switching elements Q1 and Q2 connected at a junction point between them to the other end of the oscillation circuit OC and in parallel to the smoothing condenser C1. With the current flowing through this loop 3, there can be provided a chopper action, and an output voltage of the full-wave rectifier DB provided through the condenser C3 and oscillation circuit OC is turned ON and OFF by the switching element Q2.

Further, this current through the loop 3 also forms part of a current flowing for an inverter operation. That is, while there flows a current to the oscillation element through a path of the smoothing condenser C1, inductor L2, condenser C3, oscillation element and switching element Q2, the foregoing arrangement also causes a current to flow to the oscillation circuit OC from the full-wave rectifier DB though the loop 3 of the condenser C3, oscillation circuit OC and switching element Q2, so that the input current will form part of the inverter current. Accordingly, the switching element Q2, condenser C3 and oscillation circuit OC act as constituent elements of the inverter circuit section and also as constituent elements of a chopper circuit. In contrast to any known devices, therefore, an improved double-purpose use of the circuit elements is attained so as to render the circuit arrangement to be more simplified and minimized in dimensions. Further, the currents flowing to the condenser C3 and oscillation circuit OC are not caused to be increased even when these elements are employed for both of the chopper circuit and inverter circuit section, so that the currents flowing to the switching element Q2 will not be increased and such loss or stress at the switching element as has been described with reference to the known devices of the related art also will not be increased.

Figure 2:
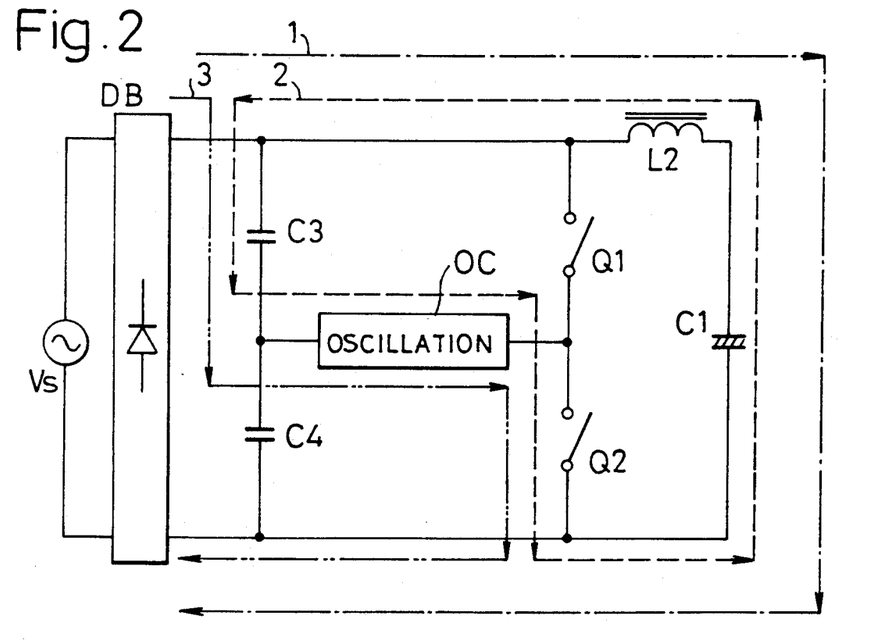
FIG. 2 is a schematic circuit diagram showing another basic arrangement of the inverter device according to the present invention.

In FIG. 2, there is shown another basic arrangement for the inverter device according to the present invention, in which the inductor L2 is connected between an end of the switching element Q1 and an end of the smoothing condenser C1, but the same charge loop 1 and discharge loop 2 as in the basic arrangement of FIG. 1 can be formed, and the same function and effect as in the case of FIG. 1 can be attained. In the present instance of the basic arrangement, on the other hand, the discharge loop can be formed also through the smoothing condenser C1, inductor L2, switching element Q1, oscillation element and condenser C4, but either the condenser C3 or C4 may be omitted since only one of the discharge loops suffices to purposes.

Further, in the basic arrangements of FIGS. 1 and 2, the condensers C3 and C4 serve to divide the DC voltage of the smoothing condenser C1 and thus are substantially the same as a so-called half-bridge inverter circuit which has been known.

Figure 3:
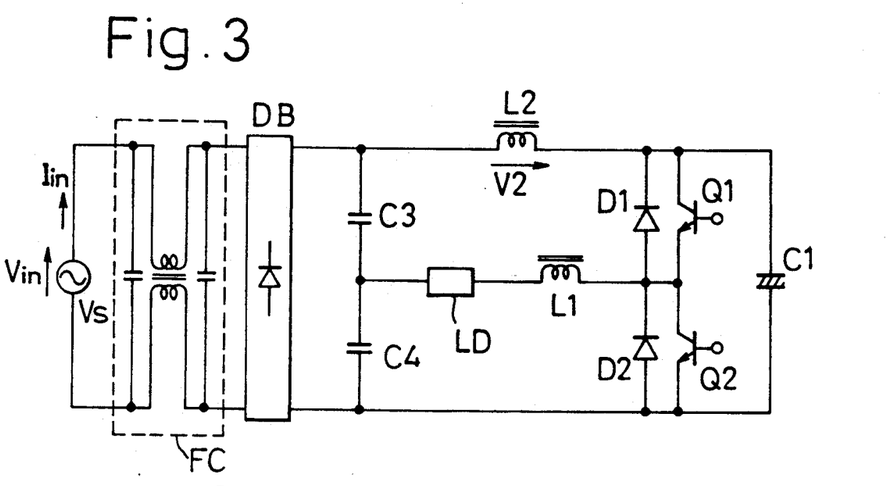
FIG. 3 is a circuit diagram showing a first embodiment based on the basic arrangement of FIG. 1 according to the present invention.

In FIG. 3, there is shown a first embodiment in which the basic arrangement of FIG. 1 is made practically more concrete, in which the oscillation circuit OC in FIG. 1 comprises an inductor L1 and a load LD, while the foregoing inductor L2 is inserted in a part of the current loop for the inverter circuit section. In the present instance, the switching elements Q1 and Q2 are arranged to be alternately turned ON and OFF by a high frequency so that a high frequency voltage can be supplied to the load LD. That is, in the event where the switching element Q1 is ON, currents are caused to flow through a path from the smoothing condenser C1 through the switching element Q1, inductor L1, such load LD as a discharge lamp and condenser C4 back to the smoothing condenser C1, as well as a path from the condenser C3 through the inductor L2, switching element Q1, inductor L1 and load LD back to the condenser C3. When the other switching element Q2 is ON, on the other hand, currents which are reverse directional to the currents when the switching element Q1 is ON are caused to flow to the load LD through a path from the other condenser C4 through the load LD, inductor L1 and switching element Q2 back to the condenser C4, and a path from the smoothing condenser C1 through the inductor L2, condenser C3, load LD, inductor L1 and switching element Q2 back to the smoothing condenser C1, whereby the load LD is furnished with the high frequency power.

Now, in the event when the switching element Q2 is ON and the current is flowing through the path from the smoothing condenser C1 through the inductor L2, condenser C3, load LD, inductor L1 and switching element Q2 back to the smoothing condenser C1, there is generated in the inductor L2 a voltage in a direction of an arrow V2 shown in the drawing, which voltage V2 can be made, with an optimum designing of the condenser C4 in its capacity, to correspond to a difference between the output voltage of the full-wave rectifier DB and the voltage of the condenser C1, whereby the full-wave rectifier DB is made conductable even when the input voltage Vin is low, and a current is caused to flow through a loop from the rectifier DB through the condenser C3, load LD, inductor L1 and switching element Q2 back to the rectifier DB. In the case when the input voltage Vin is sufficiently high, there are caused currents to flow upon turning ON of the switching element Q1, in addition to the foregoing loops, through a path from the full-wave rectifier DB through the inductor L2, switching element Q1, inductor L1, load LD and condenser C4 back to the rectifier DB, and through a path from the full-wave rectifier DB through the inductor L2 and condenser C1 back to the rectifier DB.

Figure 4:
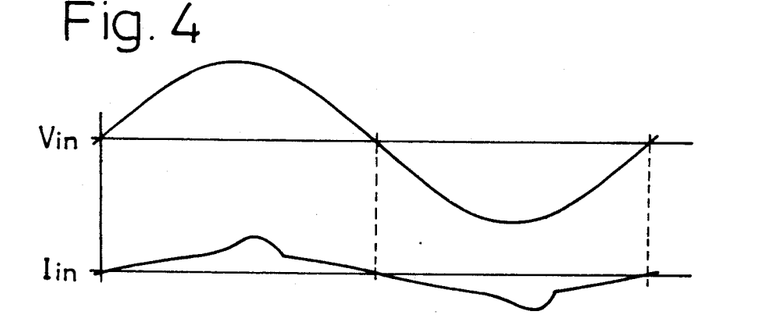
FIG. 4 is a diagram showing waveforms of an input voltage and an input current to the inverter device of FIG. 3.

Now, in the present embodiment of the foregoing arrangement, the input current Iin is made substantially proportional in the magnitude to the input source voltage Vin, so as to be an in-phase current and to be of a high input power-factor. At the same time, the input source voltage Vin can be decreased in the peak current, any higher harmomic component of the input current Iin is also decreased in response to the peak current decrement, and the input power-factor can be promoted in inverse proportion to such decrement in the higher harmomic component. In the present embodiment, further, the inductor L2 is the only additional element so that the circuit arrangement can be kept simpler. In the present instance, a filter circuit FC is inserted between the AC power source Vs and the full-wave rectifier DB so that the circuit FC will function to remove any high frequency noise component in the input current Iin. Further, the same function and effect of the device can be attained even when the condenser C4 is omitted. That is, according to the present embodiment, it is possible to obtain such excellent input voltage Vin and input current Iin as will be clear from their waveforms of FIG. 4.

Figure 5:
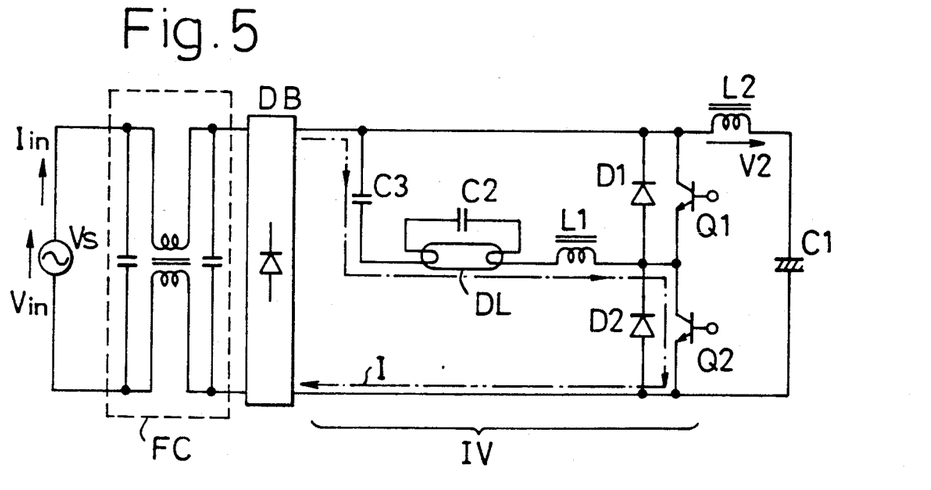
FIG. 5 is a circuit diagram showing a second embodiment of the inverter device according to the present invention.

In a second embodiment shown in FIG. 5 of the present invention, the basic arrangement shown in FIG. 2 is modified by omitting one condenser C4, whereby, while an operation closely resembling that of the first embodiment shown in FIG. 3 is attainable, this embodiment shows a more remarkable function. In the present instance, the inductor L2 is effective to lower the peak value of the input voltage, similarly to the first embodiment of FIG. 3, and also to bear as its share the voltage difference between the output voltage of the full-wave rectifier DB and the voltage of the smoothing condenser C1. With this arrangement, it is made possible to supply the input current Iin even when the input voltage Vin from the AC power source is lower than the voltage of the condenser C1.

Figure 6:
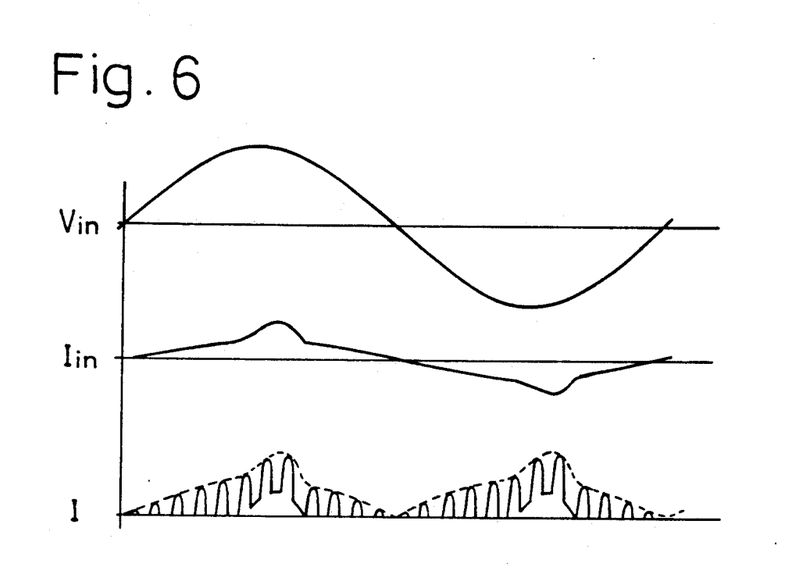
FIG. 6 is a waveform diagram of an input voltage, input current and load current of the inverter device of FIG. 5.

In this embodiment of FIG. 5, the switching element Q2 turned ON causes a current to flow to a discharge lamp DL in the inverter circuit section IV through a path from the smoothing condenser C1 through the inductor L2, condenser C3, discharge lamp DL and inductor L1 back to the switching element Q2, upon which a voltage in a direction of an arrow V2 is applied to the inductor L2. This voltage V2 is generated by a value corresponding to a difference between the output voltage of the full-wave rectifier DB and the voltage of the condenser C1 and enables the rectifier DB to be conducted. Therefore, upon the turning ON of the switching element Q2, there is caused a current to also flow through such a path as shown by a single-dot chain line, from the full-wave rectifier DB through the condenser C3, discharge lamp DL, inductor L1 and switching element Q2 back to the rectifier, which current is a discharge lamp current that flows over the entire range of each source power cycle so as to be substantially a sinusoidal current in the envelope. That is, according to the present embodiment, there can be obtained such excellent input voltage Vin, input current Iin and circuit current I as will be clear from the waveform diagram of FIG. 6.

According to the present embodiment, not only the input power factor can be elevated, but also the higher harmonic component in the input current can be effectively decreased. In the present embodiment, further, the turning ON of the switching element Q2 causes the circuit current I to flow from the full-wave rectifier DB directly to the discharge lamp DL, whereby charge and discharge currents of the smoothing condenser C1 can be made smaller so that the smoothing condenser C1 can be minimized in the capacity and the circuit efficiency can be made excellent. Further, by the insertion of the filter circuit FC between the AC power source Vs and the full-wave rectifier DB, it is made possible to prevent any high frequency noise from leaking onto source power lines. In respect that the circuit arrangement can be simplified by the double-purpose use of not only the switching element Q2 but also such circuit elements as the condensers C2 and C3 and inductor L1 for both of the chopper circuit and inverter circuit section, the present embodiment is the same as the foregoing embodiment.

Figure 7:
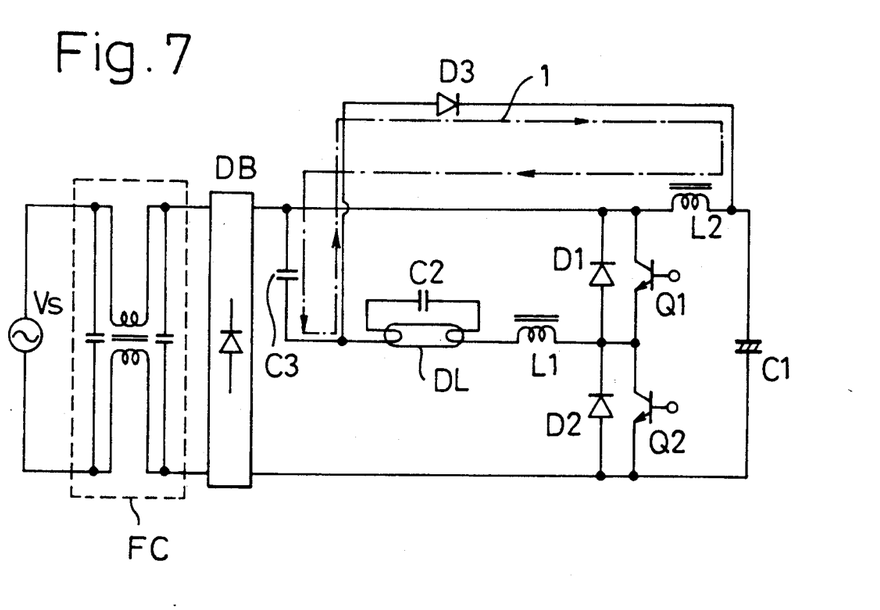
FIG. 7 shows in a circuit diagram a third embodiment of the inverter device according to the present invention.

In a third embodiment shown in FIG. 7, a diode D3 is connected between, in the second embodiment of FIG. 5, a junction point of the condenser C3 with the discharge lamp DL and a junction point of the inductor L2 with the smoothing condenser C1, and an energy discharging loop for the inductor L2 can be formed with this diode D3. That is, in the foregoing second embodiment of FIG. 5, the turning ON of the switching element Q2 causes the current to flow to the discharge lamp DL in the inverter circuit section in the loop from the smoothing condenser C1 through the inductor L2, condenser C3, discharge lamp DL and inductor L1 to the switching element Q2 to have the discharge lamp DL supplied with the power and also an energy accumulated in the inductor L2. When the switching element Q2 is turned OFF, the inverter circuit section causes the diode D1 to be turned ON, and then the energy is discharged to the condenser C3. However, since the energy discharging loop is not formed here, the inductor L2 is caused to discharge its energy abruptly through the switching element Q2 immediately before the turning OFF of the switching element Q2. In this event, there arises an excessive voltage at the inductor L2, which voltage is applied to the switching elements Q1 and Q2 as well as to the full-wave rectifier DB so that a stress at the switching elements Q1 and Q2 and full-wave rectifier DB will be apt to become larger.

In the present embodiment shown in FIG. 7, on the other hand, the provision of the energy discharging diode D3 with respect to the inductor L2 is effective to have the accumulated energy in the inductor L2 discharged through the condenser C3 and diode D3 through such loop as shown by a single-dot chain line in FIG. 7, and it is possible to restrain any excessive stress from being applied to the switching elements Q1 and Q2 as well as the full-wave rectifier DB. Other operation of this third embodiment is the same as that in the second embodiment of FIG. 5.

Figure 8:
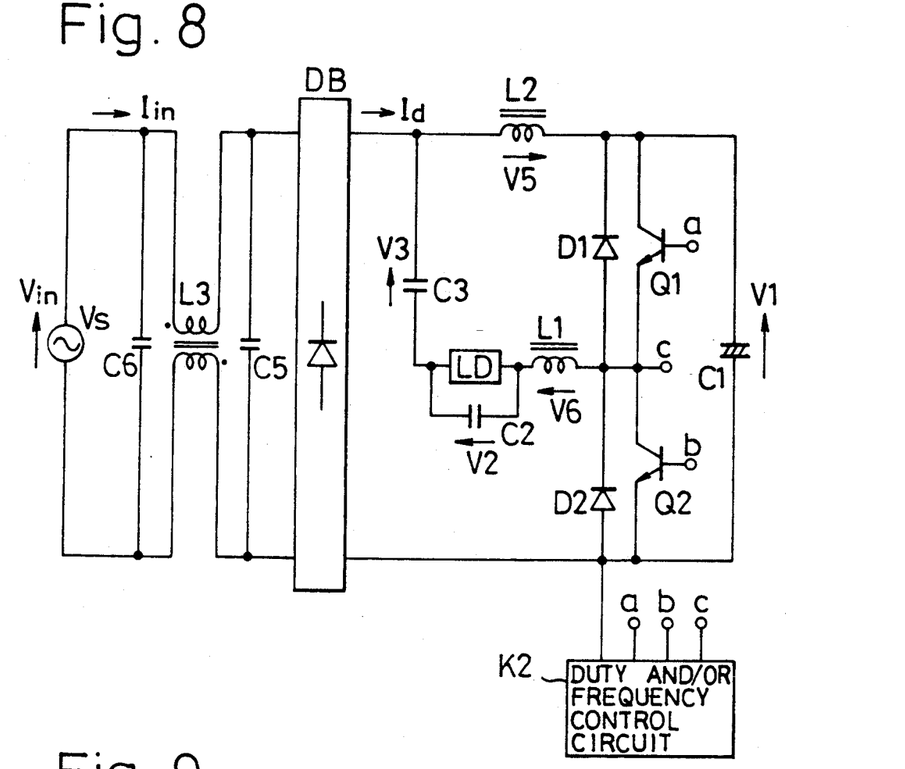
FIG. 8 shows in a circuit diagram a fourth embodiment of the inverter device according to the present invention.
Figure 9:
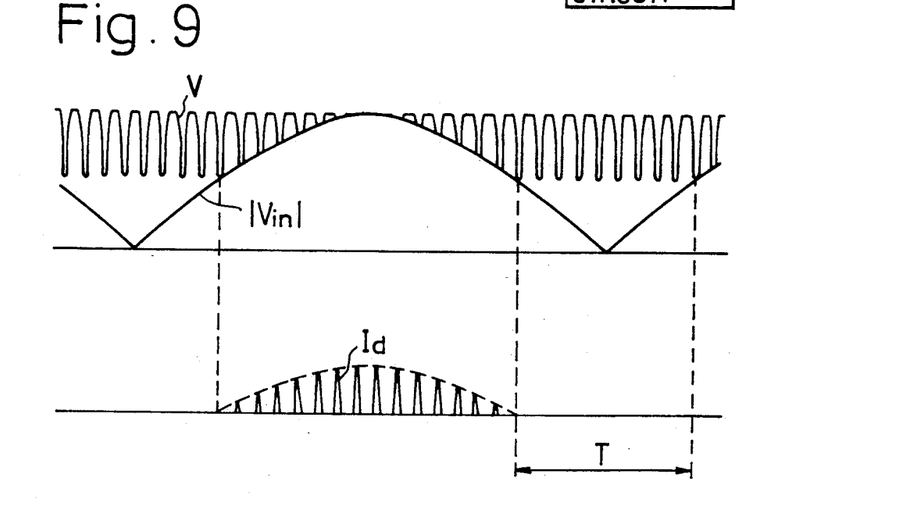
FIGS. 9 and 10 are diagrams of input current waveforms for explaining the operation of the inverter device shown in FIG. 8.

In a fourth embodiment shown in FIG. 8 of the present invention, there is additionally provided a frequency control means. Before describing more specifically the same, it should be clarified that, in the respective foregoing embodiments, the voltage generated at the inductor L2 is caused to become smaller than that provided to the smoothing condenser C1, so as to lower the ability of bearing the difference voltage between the rectified output voltage of the full-wave rectifier DB and the voltage V1 of the smoothing condenser C1 and to cause such quiescent time T as shown in FIG. 9 to arise in the input current waveform, under such conditions that the input voltage Vin is considerably higher than the load voltage, that the load is extremely small in its resistance value so as to be a light load, or that the inverter circuit section is in a weak resonating state, due to which the circuit arrangements of the foregoing embodiments involve, notwithstanding their simplicity and the high efficiency, a limitation in the ability of improving the input power-factor or of restraining the higher harmonics under such conditions as in the above, and further improvement of the arrangements is desired.

The above respect is caused due to that the voltage bearing ability of the inductor L2 is small, because, in the event where the generated voltage at the inductor L2 is small, the voltage V (V3+V2+V6) at the condensers C3 and C2, load LD and inductor L2 does not rise sufficiently to become higher than the rectified voltage |Vin| of the input source voltage Vin, and no input current is caused to flow. For removing this difficulty, it suffices the purpose to set the generated voltage at the inductor L2 to be larger and, for this purpose, it is optimum to so vary the frequency or duty as to strengthen the resonance of a system including the inductor L2, condensers C3 and C2, load LD and inductor L1.

Figure 10:
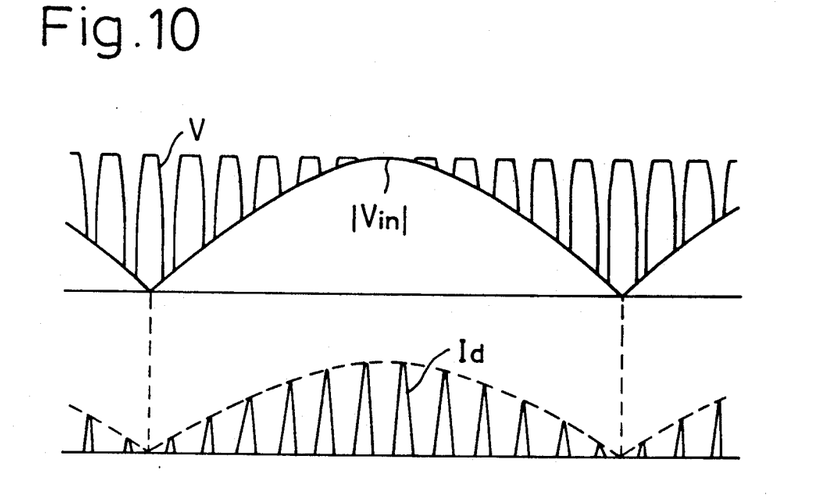

Now, in the present fourth embodiment, a duty and-/or frequency control circuit K2 is added as the frequency control means for controlling the switching frequency so as to be closer to the resonance frequency, so that a voltage V5 of the inductor L2 will be enlarged in the amplitude and the input voltage Vin will not involve any quiescent period. Further, when in the circuit arrangement of FIG. 8 the inductors L1 and L2 are so designed as to have inductance values L2>L1, the generated voltage at the inductor L2 is made larger and the voltage bearing ability of the inductor L2 for the difference voltage between the output voltage of the full-wave rectifier DB and the voltage V1 of the smoothing condenser C1 is made larger. The input current Iin is made, therefore, to involve substantially no quiescent period as shown in FIG. 10. In this case, the control circuit K2 may be so arranged as to control not only the frequency but also the duty.

Figure 11:
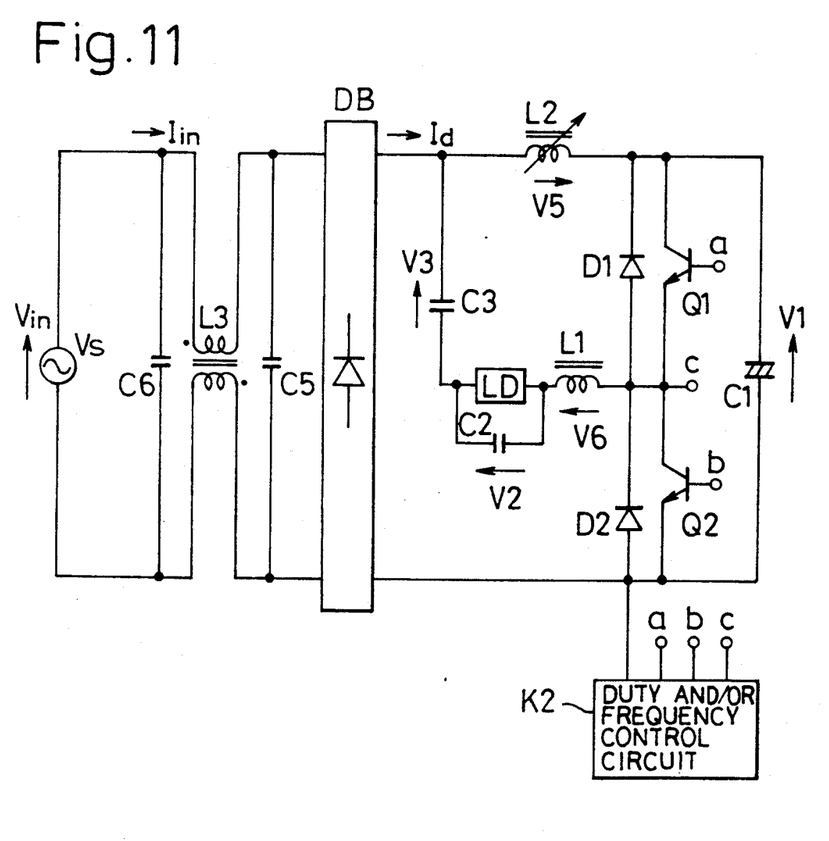
FIG. 11 is a circuit diagram showing a fifth embodiment of the inverter device according to the present invention.

In a fifth embodiment of the present invention as shown in FIG. 11, the circuit arrangement is made to render the inductance value of the inductor L2 in the embodiment of FIG. 8 to be variable. With this arrangement, the inductance value of the inductor L2 is so controlled as to be larger when the quiescent time of the input current becomes larger, and the quiescent time of the input current can be shortened. Further with this arrangement, it is made possible to render the width in which the frequency is varied by the frequency control circuit K2 to be smaller by the reduction of the quiescent time in the input current with the inductance value of the inductor 12 made variable. Further, while the inverter device is generally made to vary its output by varying the frequency, it is also made possible to maintain the output constant by optimumly adjusting the inductance value of the inductor L2.

In the event where, for example, the inverter circuit section is operated in a switching frequency range higher than the resonance frequency of the circuit, the output reduction may be attained simply by making the switching frequency higher, but this will result in its deviation from the resonance frequency of the circuit, and the generated voltage at the inductor L2 is decreased, consequent to which such quiescent time of the input current as shown in FIG. 9 is caused to occur. In order to reduce the quiescent time, it is necessary to render the switching frequency closer to the resonance frequency of the circuit, but this causes the switching frequency to be lowered so as to render the output reduction to be difficult. In this event, according to the present embodiment, the quiescent time in the input current is shortened by enlarging the inductance value of the inductor L2 so that the inductor L2 operates also as a current limiting element in the inverter circuit section, to have the output lowered. With such variable control arrangement for the inductance value of the inductor L2, it is made possible to reduce the quiescent time in the input current and to realize the output control. Even when the switching frequency is required to be varied, the varying width is made smaller so that the control can be made easier. The input power-factor or higher harmonic restraining effect can be attained in the same manner as in the foregoing embodiments.

Figure 12:
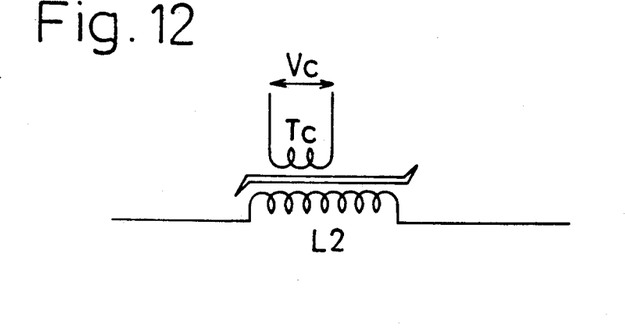
FIG. 12 shows in a fragmentary circuit diagram another working aspect of the inverter device of FIG. 11.

In FIG. 12, there is shown an example of the variable inductor, the inductance value of which is made variable by providing a secondary winding Tc with respect to the inductor L2 for varying an applied voltage Vc.

Figure 13:
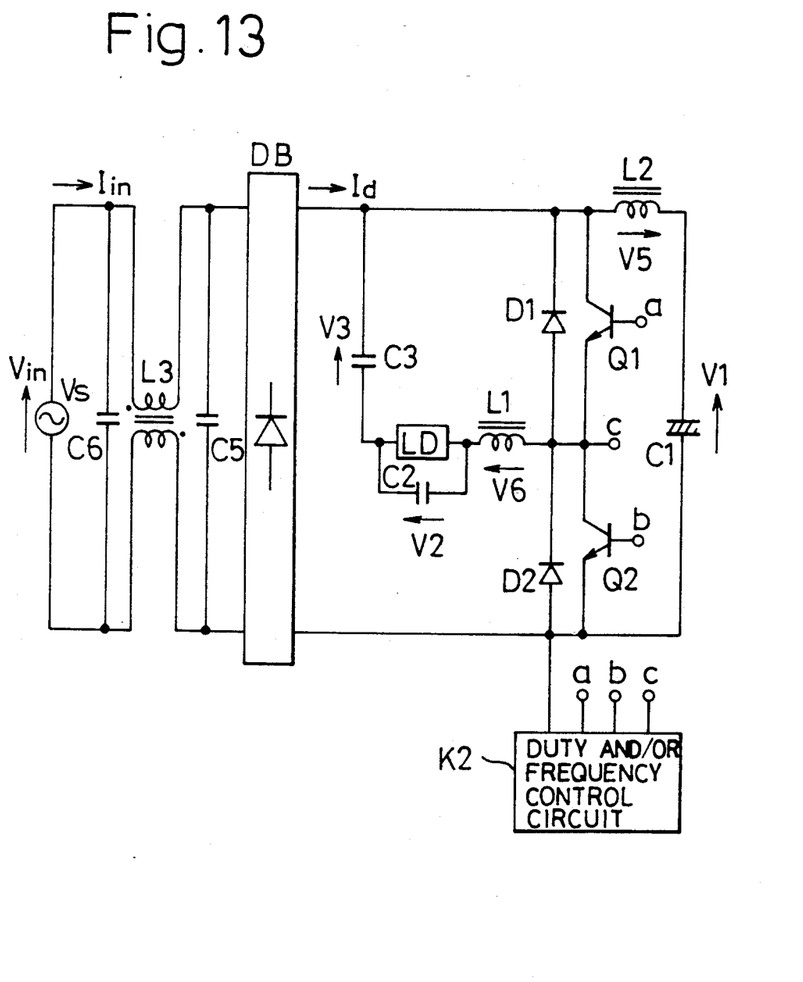
FIG. 13 is a circuit diagram of a sixth embodiment of the inverter device according to the present invention.

In a sixth embodiment of the present invention as shown in FIG. 13, the arrangement is made to insert the inductor L2 in the embodiment of FIG. 8 between the series circuit of such switching elements Q1 and Q2 as transistors and the smoothing condenser C1. In this case, the turning On of the transistor Q2 causes a current to flow through a path from the smoothing condenser C1 through the inductor L2, condenser C3, parallel circuit of load LD and condenser C2, inductor L1 and transistor Q2 back to the smoothing condenser C1, and $V1 \approx V5+V3+V2+V6$ is attained. In this event, the voltage across DC output terminals of the full-wave rectifier DB will be $V=V3+V2+V6 \approx V1-V5$ so that the input current will be made to flow even when the input voltage $|Vin|$ is lower than the voltage V1 of the smoothing condenser C1 by an amount of the voltage V5 of the inductor L2. The voltage bearing ability of the inductor L2 for the difference voltage between the output voltage of the full-wave rectifier DB and the voltage V1 of the smoothing condenser C1 is substantially the same as that in the embodiment of FIG. 8. Accordingly, the same controlling arrangement can be employed and, for the reduction of the quiescent time in the input current, the switching frequency is made closer to the circuit resonance frequency to have a large voltage V5 generated at the inductor L2. As a result, the voltage difference between the output voltage of the full-wave rectifier DB and the voltage V1 of the smoothing condenser C1 to be born by the inductor L2 is also made large, so that the input current will be caused to flow even in a period in which the input voltage $|Vin|$ is low, whereby the input power-factor can be elevated and the higher harmonic component of the input current can be reduced. It should be appreciated that, in the present embodiment, too, the arrangement for setting the inductance value of the inductor L2 to be larger than that of the inductor L1 and for rendering the inductance value of the inductor L2 to be variable can be employed in the same manner as in the foregoing embodiments.

Further, as has been clarified in the foregoing embodiments, the quiescent time in the input current can be restrained by having the desired voltage relationship satisfied, and the realization of the desired voltage relationship is not always limited to the frequency control, but such arrangement as in the followings may be also employed.

First, it is possible to arrange the circuit for the control by varying the impedance value of the inverter element or impedance element to have the oscillation state varied to be closer to the resonating state. By causing the impedance value of the respective elements varied, it is made possible to attain the desired voltage relationship. Further, it is also possible to employ an arrangement made for varying the impedance of the load to attain the oscillation state closer to the resonance state and eventually the desired voltage relationship. These controllings may be realized in practice, for example, with means for turning ON and OFF the impedance element by a bilateral switch.

Figure 14:
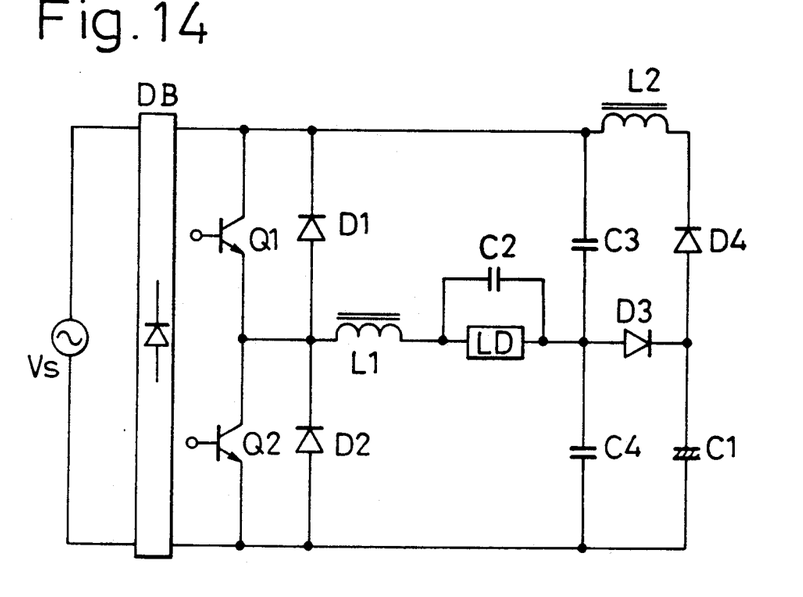
FIG. 14 is a circuit diagram of a seventh embodiment of the inverter device according to the present invention.

In a seventh embodiment of the present invention as shown in FIG. 14, the arrangement is so made as to restrain any inrush current from flowing into the smoothing condenser C1 upon connection of the power source. That is, a diode D4 is connected in series with the smoothing condenser C1 in the basic arrangement of FIG. 2, and the inrush current from the power source Vs can be restrained. In this case, a loop is formed from the condenser C3 through the diode D3 to the smoothing condenser C1 but, since the capacity of the condenser C3 is set to be smaller than that of the smoothing condenser C1, the inrush current is made to be small. Here, the charge of the smoothing condenser C1 is carried out by means of a path of the full-wave rectifier DB, condenser C3, diode D3 and smoothing condenser C1 and additionally an inverter regeneration current through the inductor L1, condenser C2, load LD, diode D3, smoothing condenser C1 and diode D2.

At this time, it is made possible to supply the DC power to the inverter circuit section by connecting a DC voltage obtained from the smoothing condenser C1, through the diode D4 and inductor L2, to both ends of the series circuit of the transistors Q1 and Q2. Further, the inductor L2 also has a function of reducing the higher harmonic component in the input current. That is, upon turing ON of the transistor Q2, a current is caused to flow from the smoothing condenser C1 through a path of the diode D4, inductor L2, condenser C3, parallel circuit of condenser C2 and load LD, inductor L1 and transistor Q2 and back to the smoothing condenser C1, upon which a voltage of a rightward direction in FIG. 14 is generated across the inductor L2, so that it is made possible to cause the input current to flow even when the output voltage of the full-wave rectifier DB is lower than the voltage of the smoothing condenser C1, and the higher harmonic component in the input current can be reduced. In the present embodiment, too, the condenser C4 may be omitted.

Figure 15:
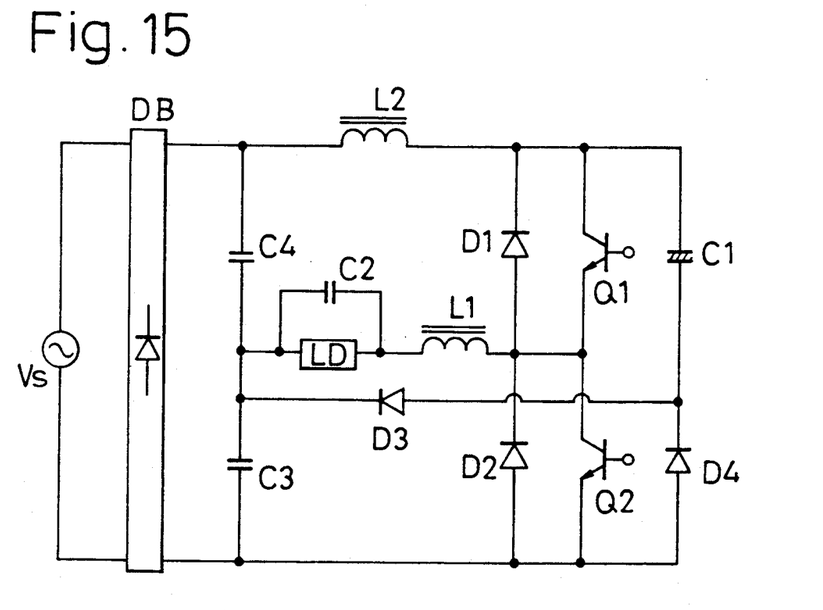
FIG. 15 is a circuit diagram of an eighth embodiment of the inverter device according to the present invention.

In an eighth embodiment shown in FIG. 15 of the present invention, the series circuit of the condensers C3 and C4 is connected across the DC output terminals of the full-wave rectifier DB, and the series circuit of the transistors Q1 and Q2 is also connected through the inductor L2 to these terminals in parallel to the circuit of the condensers C3 and C4. Between the junction point of the condensers C3 and C4 and the junction point of the transistors Q1 and Q2, the parallel circuit of the condenser C2 and load LD through the inductor L1, and the smoothing condenser C1 is connected for the charging through the diode D3 and for the discharging through the diode D4.

Also in the present embodiment, the inrush current flowing into the smoothing condenser C1 upon connection of the power source can be restrained effectively by the above arrangement. That is, any flowing of the inrush current into the smoothing condenser C1 is made small due to that the condenser C3 is made to be of a small capacity in the event when the charging current is made to flow directly from the AC power source Vs to the smoothing condenser C1 through a path of the full-wave rectifier DB, inductor L2, smoothing condenser C1, diode D3 and condenser C3 back to the rectifier DB. On the other hand, also in the present embodiment, the higher harmonic component in the input current can be effectively reduced by means of the inductor L2 inserted between the condenser C4 and the transistor Q1. That is, upon turning ON of the transistor Q2, a current is made to flow from the smoothing condenser C1 through a path of the inductor L2, condenser C4, parallel circuit of the condenser C2 and load LD, inductor L1, transistor Q2 and diode D4 back to the smoothing condenser C1, in which event a voltage in rightward direction in FIG. 15 is generated across the inductor L2, so that it can be made possible to cause the input current to flow from the full-wave rectifier DB through a path of the condenser C4, parallel circuit of the condenser C2 and load LD, inductor L1 and transistor Q2 back to the full-wave rectifier DB, and the higher harmonic component in the input current can be reduced.

Figure 16:
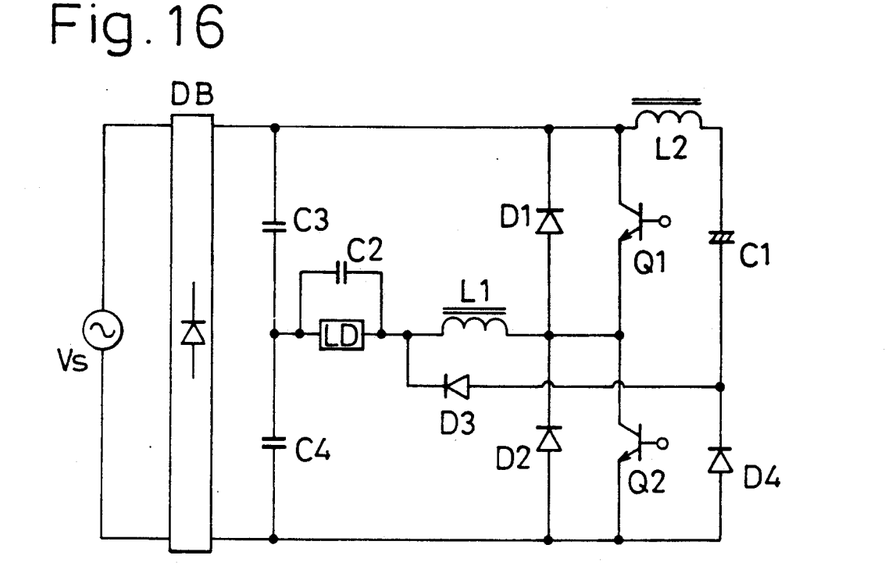
FIG. 16 is a circuit diagram of a ninth embodiment of the inverter device according to the present invention.

In a ninth embodiment of the present invention as shown in FIG. 16, the arrangement is also made for restraining the inrush current flowing into the smoothing condenser C1 upon connection of the power source. More specifically, the diode D4 is connected in series with the smoothing condenser C1 so that the inrush current from the power source Vs to the smoothing condenser C1 can be restrained. Further, for the purpose of charging the smoothing condenser C1, there is formed a voltage dropping chopper which functioning in a loop, through the diode D3, of the full-wave rectifier DB, inductor L2, smoothing condenser C1, diode D3, inductor L1 and transistor Q2. Upon turning OFF of the transistor Q2, on the other hand, the smoothing condenser C1 is charged with the accumulated energy in the inductors L1 and L2 through a loop of the inductor L2, smoothing condenser C1, diode D3, inductor L1 and diode D1. Due to this, the current from the power source Vs to the smoothing condenser C1 is caused to flow only when the transistor Q2 is turned ON. Therefore, the inrush current can be effectively restrained by optimumly executing the control of the transistor Q2 and rendering the duty in the event when the transistor Q2 is turned ON to be smaller and to be gradually increased.

Since in the present embodiment the arrangement is made to attain the voltage dropping chopper, the input current is made to flow to the smoothing condenser C1 during the periods in which the source voltage is high, and the charging voltage of the smoothing condenser C1 is supplied through the diode D4 and inductor L2 to the inverter circuit section during the periods in which the source voltage is low. That is, as the transistor Q2 turns ON, a current is made to flow from the smoothing condenser C1 through a path of the inductor L2, condenser C3, parallel circuit of condenser C2 and load LD, inductor L1, transistor Q2 and diode D4 back to the smoothing condenser C1, upon which the voltage in rightward direction in FIG. 16 is generated at the inductor L2 so that, even when the output voltage of the full-wave rectifier DB is lower than that of the smoothing condenser C1, the input current can be made to flow from the rectifier DB through a path of the condenser C3, parallel circuit of condenser C2 and load LD, inductor L1 and transistor Q2 back to the rectifier DB, whereby the higher harmonic component of the input current can be reduced.

Figure 17:
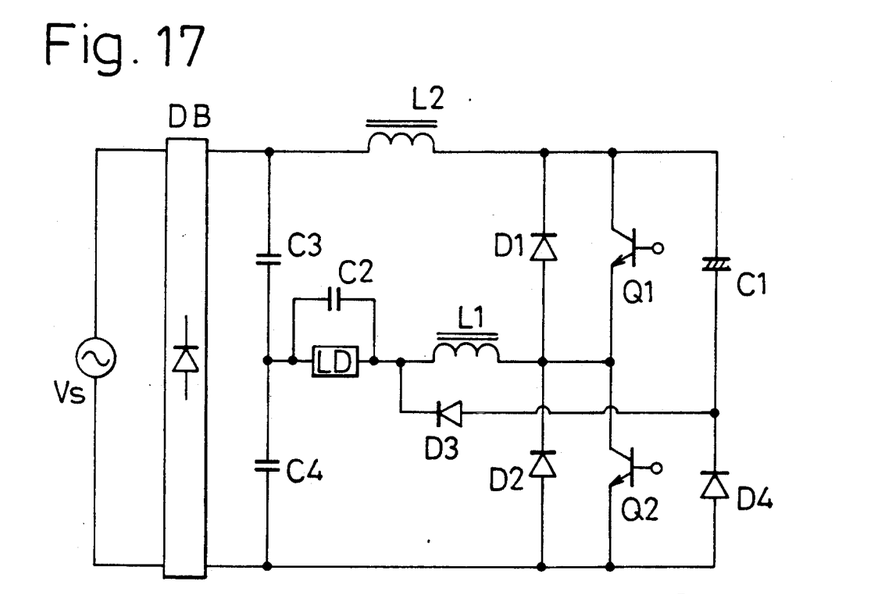
FIG. 17 is a circuit diagram showing a tenth embodiment of the inverter device according to the present invention.

In a tenth embodiment shown in FIG. 17 of the present invention, too, the arrangement is so made as to restrain the inrush current from flowing into the smoothing condenser C1 upon the connection of the power source. More specifically, the inductor L2 is inserted between the condenser C3 and the transistor Q1, in contrast to the embodiment of FIG. 16. In this case, similarly to the embodiment of FIG. 16, there can be formed a voltage dropping chopper circuit with the full-wave rectifier DB, inductor L2, condenser C1, diode D3, inductor L1 and transistor Q2, for restraining the inrush current upon the connection of the power source. Further, in the period in which the source voltage is low, a current is made to flow from the smoothing condenser C1 through a path of the inductor L2, condenser C3, parallel circuit of condenser C2 and load LD, inductor L1, transistor Q2 and diode D4 back to the smoothing condenser C1. In this event, there is generated a voltage at the inductor L2 to be in the rightward direction in FIG. 17 so that, even when the output voltage of the full-wave rectifier DB is lower than that of the smoothing condenser C1, the input current is made to flow from the full-wave rectifier DB through a path of the condenser C3, parallel circuit of condenser C2 and load LD, inductor L1 and transistor Q2 back to the rectifier DB, so that the higher harmonic component can be effectively reduced.

What is claimed is:

1. An inverter with shared chopper function for high input power factor with restrained higher harmonics comprising:
   an AC power source producing an AC source voltage;
   a rectifier having a positive terminal and a negative terminal and receiving the AC source voltage from said AC power source and producing a pulsating DC voltage;

an inductor having first and second terminals and connected at said first terminal to said positive terminal of said rectifier;

a first condenser coupled to said second terminal of said inductor for receiving through said inductor the pulsating DC voltage from said rectifier and producing a smoothed DC voltage; and an inverter circuit section connected in parallel with said rectifier, receiving the pulsating DC voltage from said rectifier and the smoothed DC voltage from said first condenser through said inductor, said inverter circuit section including:

a chopper circuit comprising switching means, an oscillation circuit including a load element wherein a high frequency voltage is applied to said load element by switching of said switching means, and a second condenser receiving the pulsating DC voltage from said rectifier, wherein said switching means, said oscillation circuit, and said second condenser form a series circuit having first and second ends and connected at said first end to said first terminal of said inductor and coupled at said second end to said second terminal of said inductor.

2. The inverter according to claim 1 wherein said switching means comprises first and second switching elements connected in series and coupled to said positive and negative terminals of said rectifier, and said series circuit is connected through said inductor to at least one of said first and second switching elements.

3. The inverter according to claim 2 comprising means for controlling operational frequencies of said first and second switching elements to shorten a quiescent time of input power from said AC power source.

4. The inverter according to claim 1 wherein said switching means comprises first and second switching elements connected in series and coupled across said first condenser, and said series circuit is connected through said inductor to at least one of said first and second switching elements.

5. The inverter according to claim 1 comprising a diode connected in parallel with said inductor.

6. The inverter according to claim 1 wherein said first condenser is connected to a second series circuit including a first diode, said second condenser, and a third condenser and a second diode is connected between said first diode and said second condenser in said second series circuit to block current flow out of said first condenser, and said first diode is connected to block current flow into said first condenser.

7. The inverter according to claim 1 wherein said inverter circuit section comprises a first diode coupled through said inductor between said positive and said negative terminals of said rectifier and to said first condenser to block current to flow into said first condenser, and a second diode coupled to said first condenser and connected to block current to flow out of said first condenser, said oscillation circuit including an oscillation inductor, and the inverter circuit section forming a first current loop from one of said positive and negative terminals of said rectifier through at least said first condenser, said second diode, said oscillation inductor, and said switching means for charging said first condenser, and a second current loop for discharging accumulated energy in said oscillation inductor to said first condenser upon turning OFF of said switching means.

* * * * *